N. Post,
Harness Hames.
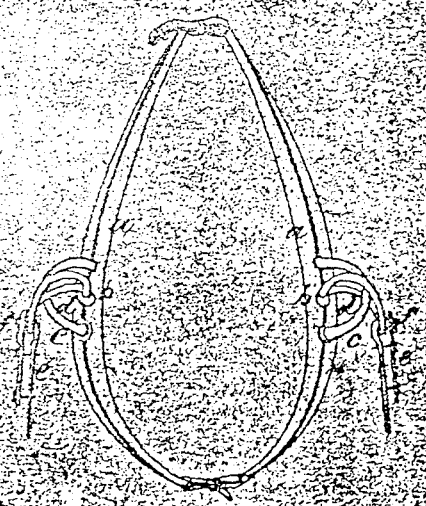
No. 80. A.L. Patented July 11, 1846.